US00RE48902E

(19) United States
(12) Reissued Patent
Lu et al.

(10) Patent Number: US RE48,902 E
(45) Date of Reissued Patent: Jan. 25, 2022

(54) TRANSITION HOUSING AND CAP FOR FIBER BREAKOUT ASSEMBLY

(71) Applicant: CommScope Technologies LLC, Hickory, NC (US)

(72) Inventors: Jing Lu, Shakopee, MN (US); Carlos Aviles, CD Juarez (MX); Marcelo Enrique Ruiz, CD Juarez (MX); Jacobo Eduardo Vazquez, CD Juarez (MX); Foad Abdulakdir Mohamed Ahmed, Minneapolis, MN (US); Adrian Navarro Valencia, Cd. Juarez (MX)

(73) Assignee: CommScope Technologies LLC, Hickory, NC (US)

(21) Appl. No.: 17/007,813

(22) Filed: Aug. 31, 2020

Related U.S. Patent Documents

Reissue of:
(64) Patent No.: 8,705,930
Issued: Apr. 22, 2014
Appl. No.: 13/162,170
Filed: Jun. 16, 2011

U.S. Applications:
(60) Provisional application No. 61/358,687, filed on Jun. 25, 2010.

(51) Int. Cl.
*G02B 6/00* (2006.01)
*G02B 6/38* (2006.01)
*G02B 6/44* (2006.01)

(52) U.S. Cl.
CPC ..... *G02B 6/3878* (2013.01); *G02B 6/4439* (2013.01); *G02B 6/4471* (2013.01); *G02B 6/4495* (2013.01)

(58) Field of Classification Search
CPC .. G02B 6/4471; G02B 6/3878; G02B 6/4439; G02B 6/4495
See application file for complete search history.

(56) References Cited

U.S. PATENT DOCUMENTS 4,441,786 A * 4/1984 Hulin et al. ..... 385/139
5,231,688 A 7/1993 Zimmer
(Continued)

OTHER PUBLICATIONS

Exhibit A, Fanout product by ADC Telecommunications, Inc., 2 pages, admitted as prior art as of Jun. 25, 2010.
(Continued)

*Primary Examiner* — Deandra M Hughes
(74) *Attorney, Agent, or Firm* — Merchant & Gould P.C.

(57) ABSTRACT

A breakout assembly in accordance with one aspect of the invention includes a housing including a tubular body defining a passage extending from a first end to an opposite second end of the body. An interior surface of the body includes a plurality of longitudinal guides, the interior surface further including a stop. The tubular body defines a plurality of openings extending through the body on opposite sides of the stop. The breakout assembly further includes a cap which is slidably received within the body of the housing, wherein notches within the cap receive the guides of the housing, and wherein the cap is engageable with the stop. The cap defines a plurality of internal openings extending through the cap. A multi-fiber cable can be received within the body from one end, and a plurality of breakout tubings are received within the body of the opposite end. The multi-fiber cable includes a breakout end terminating within the tubular body wherein a plurality of the broken out fibers pass through the cap, and into the breakout tubings. In one preferred embodiment, epoxy is placed within the tubular body, on opposite sides of the cap.

6 Claims, 7 Drawing Sheets

(56) References Cited

U.S. PATENT DOCUMENTS

| | | | | |
|---|---|---|---|---|
| 5,381,501 | A * | 1/1995 | Cardinal et al. | 385/54 |
| 5,473,718 | A * | 12/1995 | Sommer | 385/87 |
| 5,970,195 | A | 10/1999 | Brown | |
| 6,104,855 | A * | 8/2000 | Jeon | 385/139 |
| 6,389,214 | B1 * | 5/2002 | Smith et al. | 385/136 |
| 6,623,173 | B1 * | 9/2003 | Grois et al. | 385/76 |
| 6,738,555 | B1 * | 5/2004 | Cooke et al. | 385/136 |
| 6,885,798 | B2 | 4/2005 | Zimmel | |
| 6,909,828 | B2 | 6/2005 | Zimmel et al. | |
| 7,035,510 | B2 | 4/2006 | Zimmel et al. | |
| 7,121,732 | B2 * | 10/2006 | Pimpinella et al. | 385/53 |
| 7,221,832 | B2 | 5/2007 | Tinucci | |
| 7,269,319 | B2 | 9/2007 | Zimmel | |
| 7,270,485 | B1 * | 9/2007 | Robinson et al. | 385/55 |
| 7,280,725 | B2 | 10/2007 | Brown et al. | |
| 7,418,181 | B2 | 8/2008 | Zimmel et al. | |
| 7,440,669 | B2 | 10/2008 | Tinucci | |
| 7,664,363 | B1 * | 2/2010 | Mowery, Sr. | 385/137 |
| 7,711,236 | B2 | 5/2010 | Gonzalez et al. | |
| 7,738,759 | B2 * | 6/2010 | Parikh et al. | 385/136 |
| 8,172,465 | B2 * | 5/2012 | Kleeberger | 385/76 |
| 8,705,930 | B2 * | 4/2014 | Lu | G02B 6/3878 385/137 |
| 10,649,164 | B1 * | 5/2020 | Elsaadani | G02B 6/4416 |
| 2008/0138020 | A1 * | 6/2008 | Robinson et al. | 385/106 |
| 2008/0138026 | A1 * | 6/2008 | Yow et al. | 385/137 |
| 2009/0060421 | A1 * | 3/2009 | Parikh | G02B 6/4442 385/71 |
| 2009/0103881 | A1 * | 4/2009 | Gonzalez et al. | 385/137 |
| 2010/0092136 | A1 | 4/2010 | Nhep | |
| 2010/0202740 | A1 * | 8/2010 | Barlowe | G02B 6/4471 385/100 |
| 2010/0215331 | A1 | 8/2010 | Gonzalez et al. | |
| 2011/0317975 | A1 * | 12/2011 | Lu | G02B 6/3878 385/137 |
| 2020/0386064 | A1 * | 12/2020 | Metcalf | E21B 19/14 |
| 2021/0218233 | A1 * | 7/2021 | Bran De Leon | F16L 3/221 |

OTHER PUBLICATIONS

Exhibit B, Fanout product by ADC Telecommunications, Inc., 5 pages, admitted as prior art as of Jun. 25, 2010.

Exhibit C, Fanout product product by ADC Telecommunications, Inc., 7 pages, admitted as prior art as of Jun. 25, 2010.

Exhibit D, 24 Fiber Transition Housing by ADC Telecommunications, Inc., 2 pages, admitted as prior art as of Jun. 25, 2010.

* cited by examiner

TRANSITION HOUSING AND CAP FOR FIBER BREAKOUT ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims the benefit of U.S. Provisional Patent Application Ser. No. 61/358,687, filed Jun. 25, 2010, which application is hereby incorporated by reference in its entirety.

FIELD OF INVENTION

The present inventions relates to cable breakout assembles.

BACKGROUND OF THE INVENTION

A cable fanout or breakout assembly transitions from a cable including a single jacket around multiple fibers to breakouts of individual fibers or groups of fibers. Further improvements in this area are desired.

SUMMARY OF THE INVENTION

A breakout assembly in accordance with one aspect of the invention includes a housing including a tubular body defining a passage extending from a first end to an opposite second end of the body. An interior surface of the body includes a plurality of longitudinal guides, the interior surface further including an intermediate stop. The tubular body defines a plurality of openings extending through the body. The openings are positioned on opposite sides of the stop. The breakout assembly further includes a cap which is slidably received within the body of the housing, wherein mating guides on the cap receive the guides of the housing, and wherein the cap is engageable with the stop. The cap defines a plurality of internal openings extending through the cap.

A multi-fiber cable can be received within the body from one end, and a plurality of breakout tubings are received within the body from the opposite end. The multi-fiber cable includes a breakout end terminating within the body wherein a plurality of the broken out fibers pass through the cap, and into the breakout tubings. In one preferred embodiment, an epoxy is placed within the body, on opposite sides of the cap.

DETAILED DESCRIPTION

Figure 1:
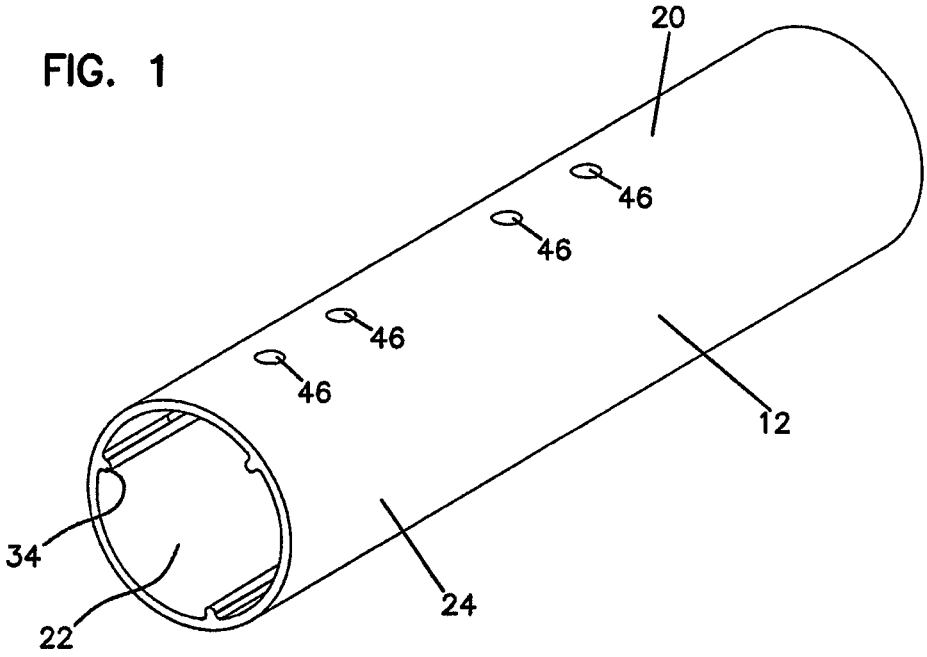
FIG. 1 is a perspective view of a housing of a fiber breakout assembly in accordance with one embodiment of the invention.
Figure 2:
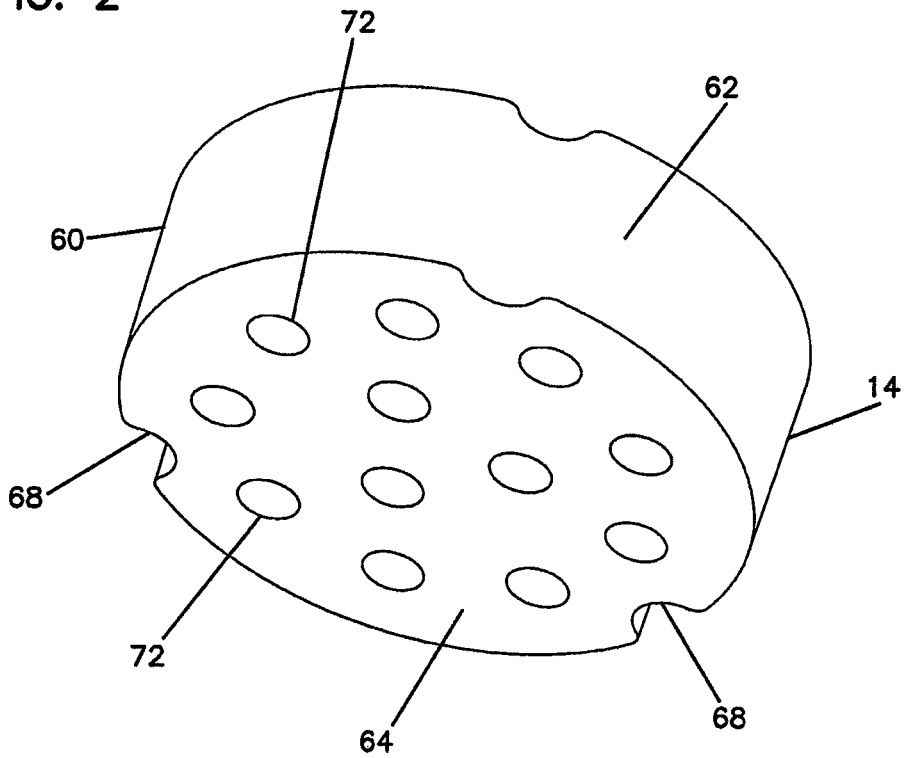
FIG. 2 is a perspective view of a cap of a fiber breakout assembly in accordance with one embodiment of the invention.
Figure 5:
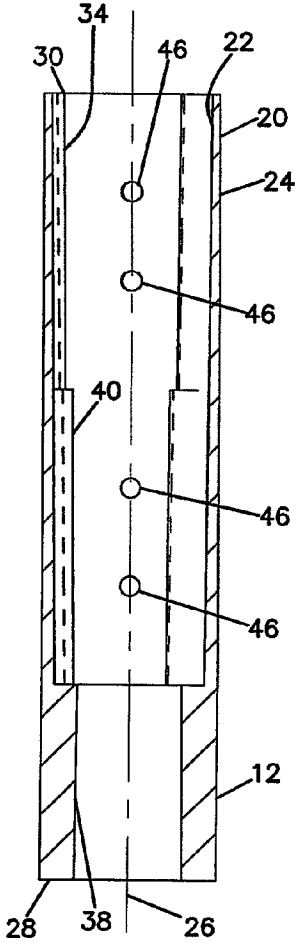
FIG. 5 is a further cross-sectional side view of the housing of FIG. 1.
Figure 4:
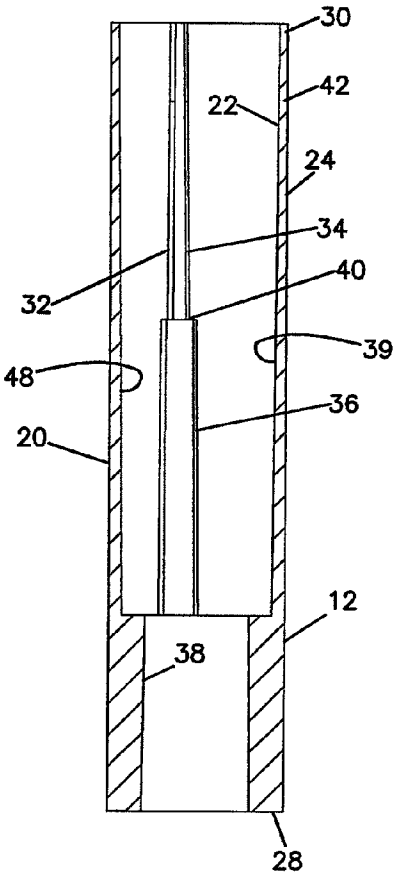
FIG. 4 is a cross-sectional side view of the housing of FIG. 1.
Figure 3:
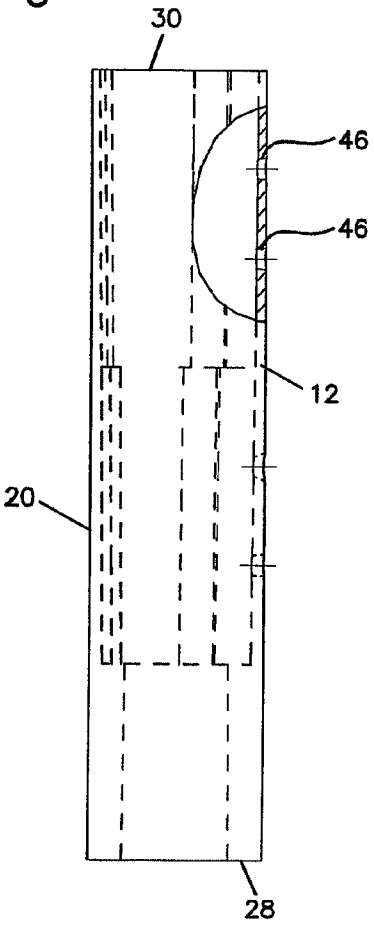
FIG. 3 is a side view of the housing of FIG. 1 with portions shown in cross-section.
Figure 6:
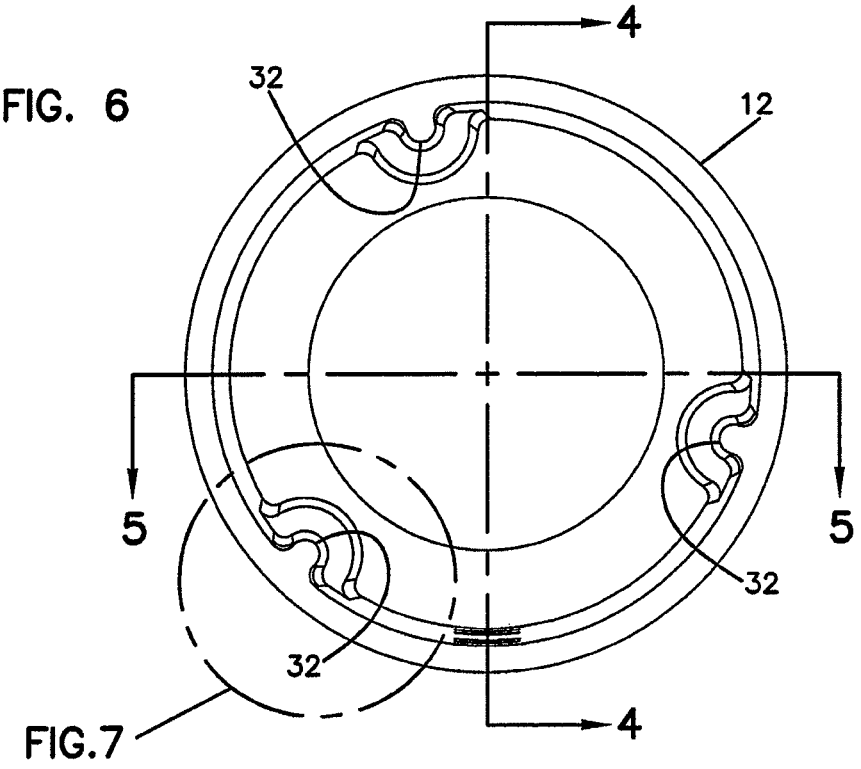
FIG. 6 is an end view of housing of FIG. 1.
Figure 7:
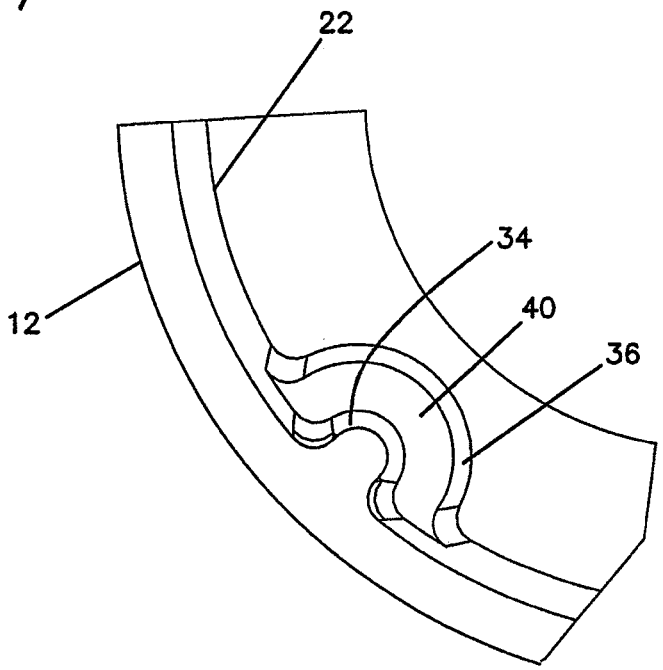
FIG. 7 is an enlarged view of a portion of the end view of FIG. 6.

Referring now to FIGS. 1-14, a fiber breakout assembly 10 is shown. Fiber breakout assembly 10 includes a housing 12 as shown in FIG. 1, and a cap 14 as shown in FIG. 2. In FIG. 13, a cable assembly 250 is shown including two fiber breakout assemblies 10. The breakout assemblies 10 transition from a multi-fiber cable 200 into fiber breakouts 220. The breakout 220 can be single fiber breakouts or multiple fiber breakouts, or combinations of the two.

Referring now to FIGS. 1, and 3-7, housing 12 includes a tubular body 20 including an interior surface 22 and an exterior surface 24. Body 20 includes a longitudinal axis 26 extending between a first end 28 and an opposite end 30. Body 20 has a generally cylindrical outer shape.

Interior surface 22 of body 20 includes interior longitudinal guide structures 32 which include first guides 34 and second guides 36. A stop surface 40 is defined between first guides 34 and second guides 36. Second guides 36 are larger in shape than first guides 34. End 28 of housing 12 defines a reduced diameter at passage 38 relative to middle area 39 and end 30. A multi-fiber cable 200 enters at end 28, through passage 38. Individual breakout cables 220 exit at end 30. A plurality of openings 46 extend through a sidewall 42 of body 20, and allow for epoxy to be introduced to the interior of body 20. Wall surface 48 can be provided with a taper, such as 1°, that widens as surface 48 approaches end 30.

Figure 9:
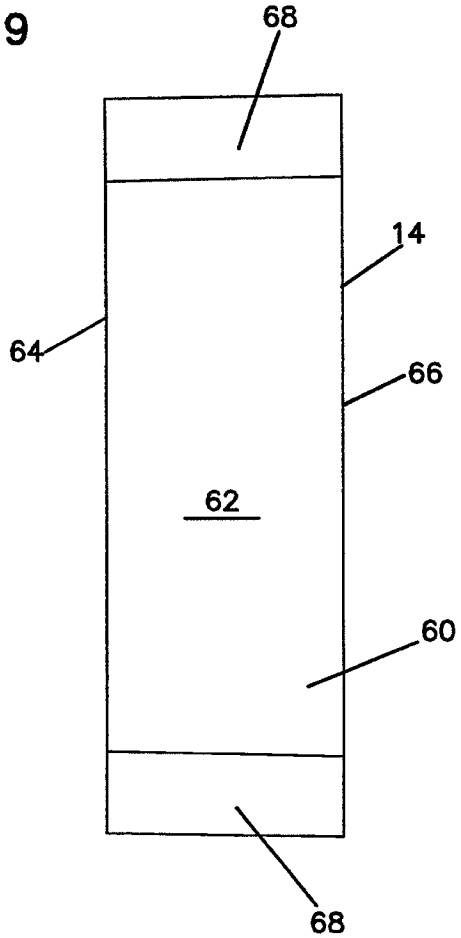
FIG. 9 is side view of the cap of FIG. 8.
Figure 8:
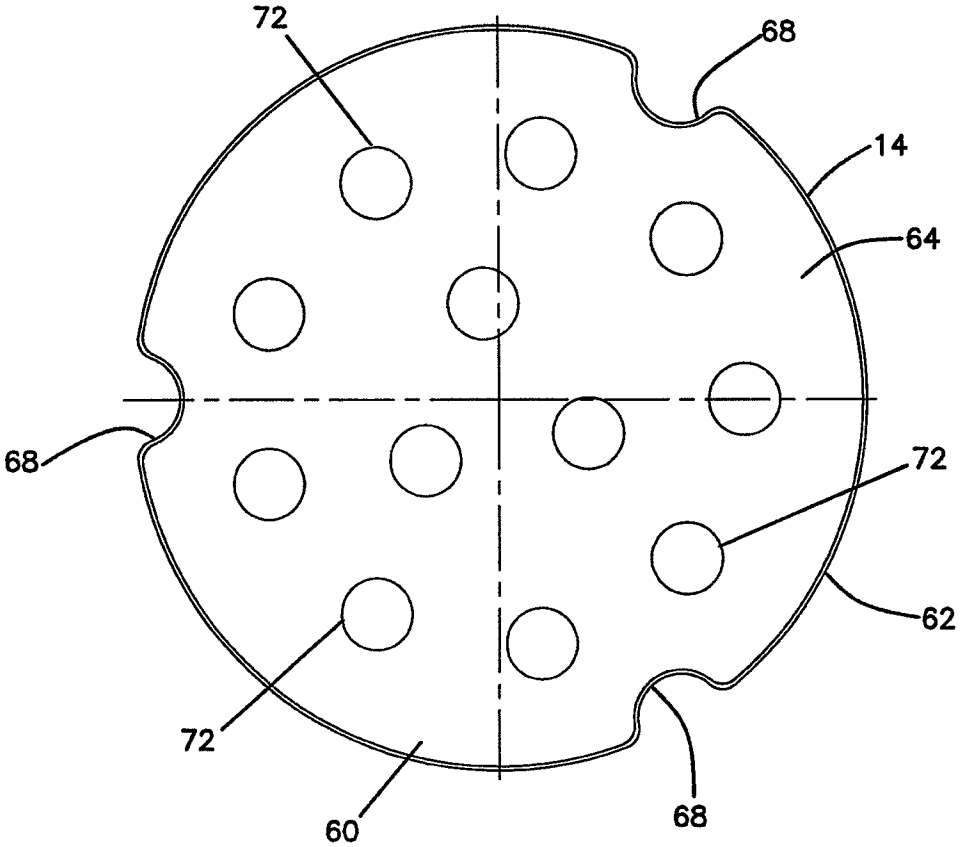
FIG. 8 is an end view of the cap of FIG. 2.

Referring now to FIGS. 2, 8 and 9, cap 14 includes a body 60 having a side 62, a first end 64, and a second end 66. Body 60 includes notches 68 along side 62. Notches 68 form mating guide structures for mating with first guides 34. A plurality of openings 72 pass through body between ends 64, 66 for receiving the breakout fibers. Cap 14 can be provided with a taper on side 62, such as 1° that widens from end 64 to end 66.

Figure 12:
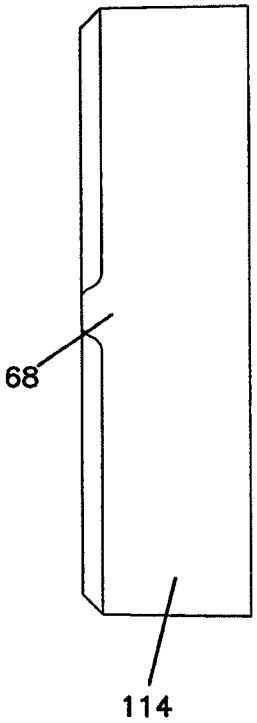
FIG. 12 is a side view of the cap of FIG. 10.
Figure 11:
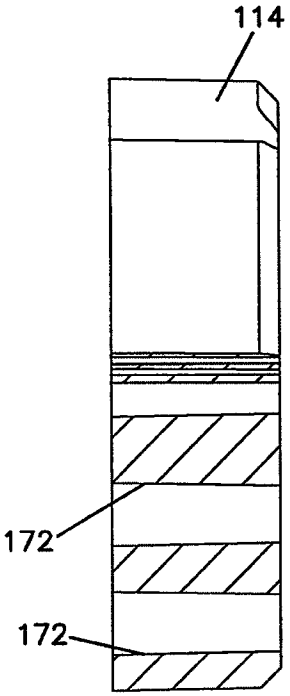
FIG. 11 is a partial cross-sectional side view of the cap of FIG. 10.
Figure 10:
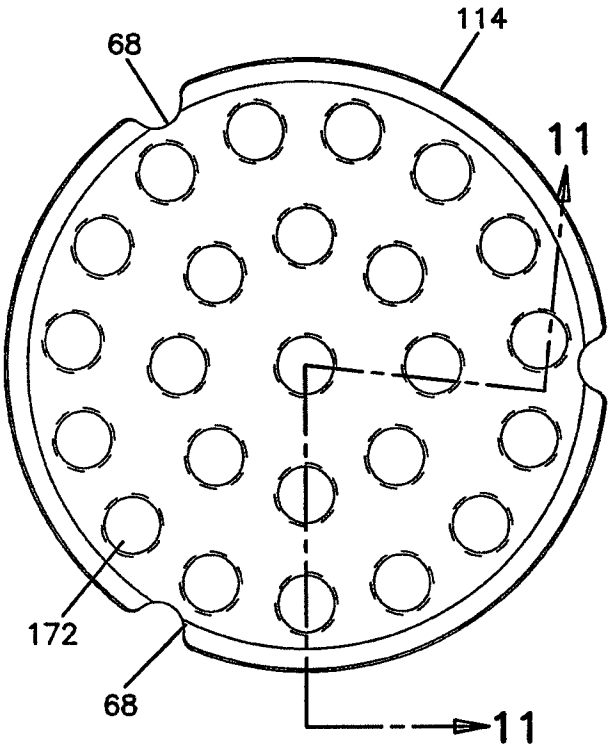
FIG. 10 is an end view of an alternative embodiment of a cap.
Figure 13:
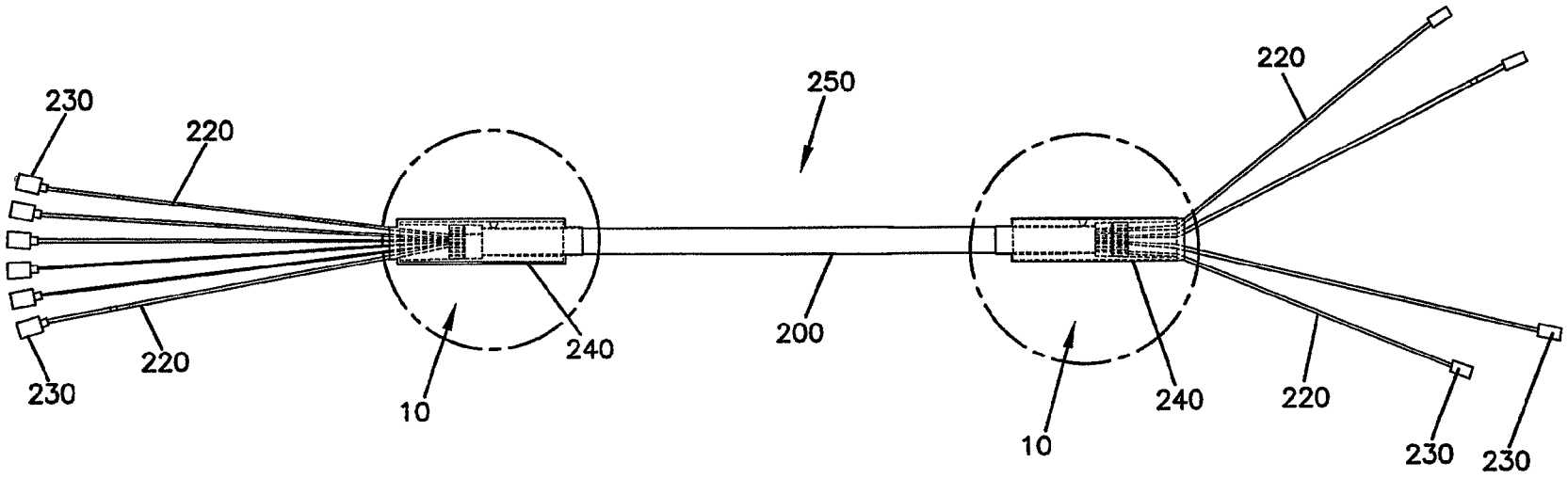
FIG. 13 is a multi-fiber cable including two fiber breakout assemblies on opposite ends of the cable.

As shown in FIGS. 10-12, alternative cap 114 includes 24 openings 172, instead of 12 openings 72, as shown for cap 14. Alternative cap 114 can be the same size as cap 14. In the illustrated embodiment, cap 114 is larger. The corresponding housing for use with larger cap 114 is like housing 12, but sized larger to receive cap 114.

Figure 14:
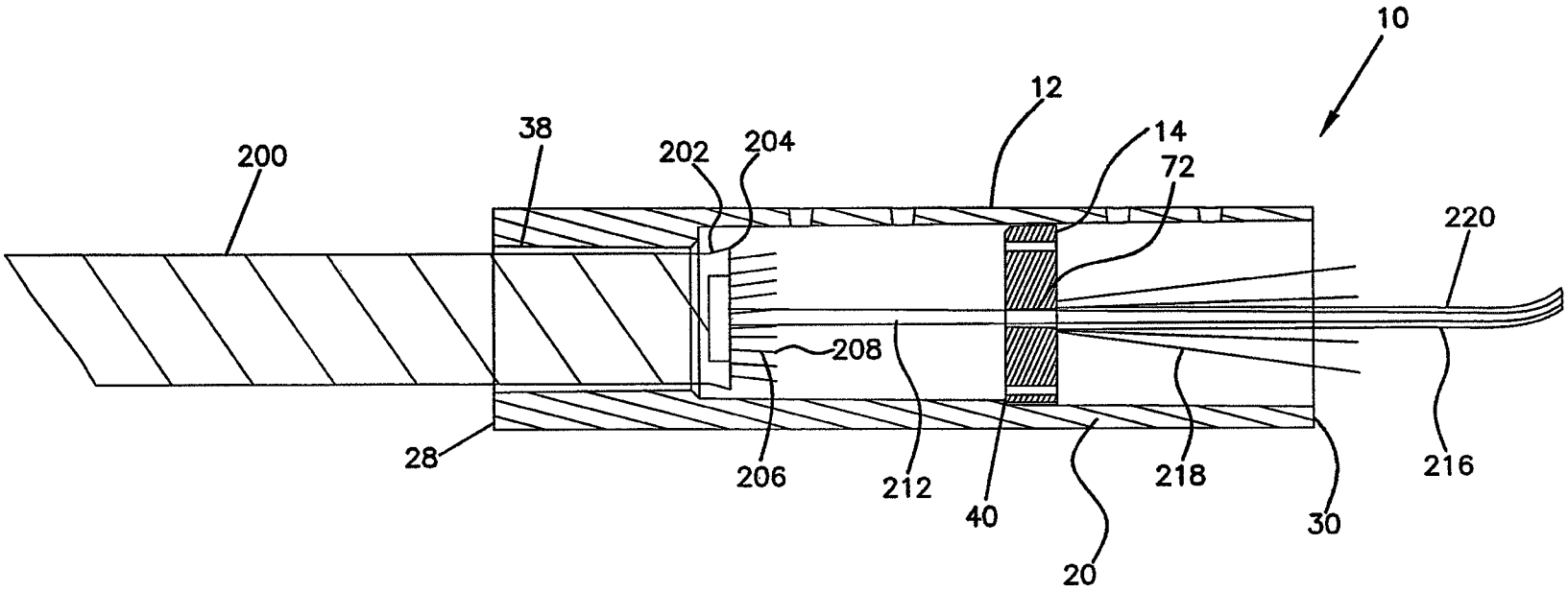
FIG. 14 is a cross-sectional side view of one end of the multi-fiber cable including one of the breakout assemblies.

Referring now to FIGS. 13 and 14, multi-fiber cable 200 includes a jacket 202 having an end 204. Strength members 206, such as Kevlar, are provided within multi-fiber cable 200. Strength members 206 extend to ends 208. The individual fibers or groups of fibers 212 extend through multi-fiber cable 200 past end 204 of jacket 202. End 204 of jacket 202 is positioned within housing 12, as shown in FIG. 14. The breakout fibers 212 pass through the openings 72 in cap positioned within body 20 of housing 12. Cap 14 is positioned within body 20 from end 30 and is slid toward end 28 until cap 14 engages stop surface 40. Guides 34 and notches 68 keep cap 14 from twisting or becoming misaligned. Not all of openings 72 are required to be used.

Breakout tubings 216 are inserted through end 30 adjacent to openings 72 of cap 14. Strength members 218 of breakout tubings are pulled back and also reside within body 20 of housing 12. Once the cable is prepared as shown in FIG. 14, epoxy can be introduced into openings 46 so that epoxy fills the interior of body 20 on opposite sides of cap 14. There are two openings 46 on each side of cap 14. While one opening 46 is used for epoxy injection, the other one is used to allow air escape during the injection process. The individual breakout tubings 216 and the individual fibers 212 can be connectorized with connectors 230. As shown, at least one fiber 212 is positioned within each breakout tubing 216. Multiple fibers can be positioned within each breakout tubing, and terminated by a multi-fiber connector, such as an MPO connector. Once the epoxy is cured, a heat shrink 240 can be positioned around housing 12, as shown in FIG. 13.

Example multi-fiber cables 200 can include 24, 12, 8, 6 or 4 fibers. Other cables can be used. In one example the fibers are 900 mm fibers. The breakout tubings 216 can be 1.7 mm or 2.0 mm Kevlar reinforced tubing. In the illustrated embodiments, the outer diameter of the breakout assembly including the heat shrink 240 is preferably less than or equal to 0.5 inches for cap 14. For cap 114 and the corresponding housing (including 24 holes 172), the outer diameter including the heat shrink is preferably less than or equal to 0.6 inches.

Various modifications and alterations of this disclosure will become apparent to those skilled in the art without departing from the scope and spirit of this disclosure, and it should be understood that the inventive features are not to be unduly limited to the illustrative embodiments set forth herein.

What is claimed is:

1. A fiber breakout assembly comprising:

a housing including a tubular body defining a passage extending from a first end to an opposite second end of the tubular body, the housing defining a longitudinal axis extending parallel to the passage, the tubular body having an interior surface and an exterior surface;

the interior surface including a plurality of longitudinal guides extending from the second end of the tubular body;

the interior surface including a stop located between the first and second ends of the tubular body;

the tubular body defining a plurality of openings extending from the exterior surface to the interior surface;

a cap including a body having a first end, a second opposite end, and a side extending between the first and second ends of the cap;

the side defining a plurality of notches sized for mating engagement with the guides of the housing;

the body of the cap defining a plurality of internal openings extending from the first end of the cap to the second end of the cap;

wherein the cap is slidably received within the passage of the tubular body of the housing from the second end of the tubular body, wherein the notches of the cap receive the guides of the housing, wherein the cap is engageable with the stop to limit movement of the cap past the stop.

2. The assembly of claim 1, wherein the guides are equally spaced around the interior surface of the tubular body.

3. The assembly of claim 2, wherein three guides are provided.

4. The assembly of claim 1, wherein twelve internal openings are provided in the cap.

5. The assembly of claim 1, wherein twenty-four internal openings are provided in the cap.

6. A fiber breakout assembly comprising:

a housing including a tubular body defining a passage extending from a first end to an opposite second end of the tubular body, the housing defining a longitudinal axis extending parallel to the passage, the tubular body having an interior surface and an exterior surface;

the interior surface including a plurality of longitudinal guides extending from the second end of the tubular body;

the interior surface including a stop located between the first and second ends of the tubular body;

the tubular body defining a plurality of openings extending from the exterior surface to the interior surface;

a cap including a body having a first end, a second opposite end, and a side extending between the first and second ends of the cap;

the side defining a plurality of notches sized for mating engagement with the guides of the housing;

the body of the cap defining a plurality of internal openings extending from the first end of the cap to the second end of the cap;

wherein the cap is slidably received within the passage of the tubular body of the housing from the second end of the tubular body, wherein the notches of the cap receive the guides of the housing, wherein the cap is engageable with the stop to limit movement of the cap past the stop;

a multi-fiber cable received within the passage from the first end of the tubular body;

a plurality of breakout tubings received within the passage from the second end of the tubular body;

the multi-fiber cable including a breakout end terminating within the passage wherein a plurality of broken out fibers pass through the cap and into the breakout tubings;

epoxy within the passage on opposite sides of the cap.

* * * * *